US012671979B2

(12) United States Patent (10) Patent No.: US 12,671,979 B2
Won et al. (45) Date of Patent: Jun. 30, 2026

(54) METHOD, APPARATUS AND COMPUTER PROGRAM

(71) Applicant: Nokia Technologies Oy, Espoo (FI)

(72) Inventors: Sung Hwan Won, Dallas, TX (US);
Martin Öttl, Munich (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/960,595

(22) Filed: Nov. 26, 2024

(65) Prior Publication Data

US 2025/0088842 A1 Mar. 13, 2025

Related U.S. Application Data

(63) Continuation of application No. PCT/EP2024/052738, filed on Feb. 5, 2024.

(30) Foreign Application Priority Data

Feb. 20, 2023 (GB) ..................................... 2302382

(51) Int. Cl.
H04W 8/20 (2009.01)
H04W 48/18 (2009.01)
*H04W 84/04* (2009.01)

(52) U.S. Cl.
CPC ........... H04W 8/205 (2013.01); H04W 48/18 (2013.01); *H04W 84/042* (2013.01)

(58) Field of Classification Search
CPC .... H04W 8/205; H04W 48/18; H04W 84/042
See application file for complete search history.

(56) References Cited

U.S. PATENT DOCUMENTS 11,202,253 B2 12/2021 Russell et al.
2019/0044980 A1* 2/2019 Russell ............... H04L 65/1073
(Continued)

FOREIGN PATENT DOCUMENTS

WO 2021/144496 A1 7/2021
WO 2021/201864 A1 10/2021
(Continued)

OTHER PUBLICATIONS

"3rd Generation Partnership Project; Technical Specification Group Core Network and Terminals; Mission Critical Services (MCS) configuration management; Protocol specification (Release 18)", 3GPP TS 24.484, V18.0.0, Dec. 2022, pp. 1-242.
(Continued)

*Primary Examiner* — Wayne H Cai
(74) *Attorney, Agent, or Firm* — Nokia Technologies Oy

(57) ABSTRACT

There is provided an apparatus comprising receiving, from a primary mission critical system, one or more user profile configuration documents comprising information identifying one or more partner mission critical systems to which the user equipment can migrate, and a respective one or more user equipment initial configurations associated with each of the one or more partner mission critical systems; selecting a partner mission critical system to migrate to from among the one or more partner mission critical systems; selecting, from the received one or more user profile configuration documents, a user profile configuration document for use in the migration; and based on the selected user profile configuration document, performing migration to the selected partner mission critical system.

15 Claims, 5 Drawing Sheets

---

400 receiving, from a primary mission critical system, one or more user profile configuration documents comprising information identifying one or more partner mission critical systems to which the user equipment can migrate, and a respective one or more user equipment initial configurations associated with each of the one or more partner mission critical systems.

402 selecting a partner mission critical system to migrate to from among the one or more partner mission critical systems 404 selecting, from the received one or more user profile configuration documents, a user profile configuration document for use in the migration 406 based on the selected user profile configuration document, performing migration to the selected partner mission critical system

408 sending, to a user equipment, one or more user profile configuration documents comprising information identifying one or more partner mission critical systems to which the user equipment can migrate, and a respective one or more user equipment initial configurations associated with each of the one or more partner mission critical systems.

(56)               References Cited

U.S. PATENT DOCUMENTS

| | | | |
|---|---|---|---|
| 2021/0282084 A1 | 9/2021 | Catovic et al. | |
| 2022/0104116 A1 | 3/2022 | Russell et al. | |

FOREIGN PATENT DOCUMENTS

| | | | |
|---|---|---|---|
| WO | 2022/003400 A1 | 1/2022 | |
| WO | 2022/053159 A1 | 3/2022 | |

OTHER PUBLICATIONS

"3rd Generation Partnership Project; Technical Specification Group Services and System Aspects; Common functional architecture to support mission critical services; Stage 2 (Release 18)", 3GPP TS 23.280, V18.4.0, Dec. 2022, pp. 1-328.

"New WID on mission critical system migration and interconnection enhancements", 3GPP TSG-CT WG1 Meeting #139, C1-226822, Agenda: 18.1.1, Nokia, Nov. 14-18, 2022, 4 pages.

"New element for migration in the MCPTT user profile configuration document", 3GPP TSG-CT WG1 Meeting #140, C1-23xxxx, Nokia, Feb. 27-Mar. 3, 2023, 32 pages.

"Pseudo-CR on migration using public 5GS networks and/or non-public 5GS networks", 3GPP TSG-SA WG6 Meeting #42-bis-e, S6-210771r1, Agenda: 7.5, UIC, Apr. 12-20, 2021, 3 pages.

"3rd Generation Partnership Project; Technical Specification Group Services and System Aspects; Mission Critical Push To Talk (MCPTT); Stage 1 (Release 17)", 3GPP TS 22.179, V17.1.0, Mar. 2022, pp. 1-88.

"3rd Generation Partnership Project; Technical Specification Group Services and System Aspects; Mission Critical Video services (Release 17)", 3GPP TS 22.281, V17.0.0, Mar. 2022, pp. 1-31.

"3rd Generation Partnership Project; Technical Specification Group Services and System Aspects; Mission Critical Data services Release 17", 3GPP TS 22.282, V17.0.0, Mar. 2022, pp. 1-21.

Search Report received for corresponding United Kingdom Patent Application No. 2302382.3, dated Aug. 23, 2023, 4 pages.

"User profile retrieval for migration", 3GPP TSG-SA WG6 Meeting #18, S6-171090, Motorola Solutions, Jul. 17-21, 2017, 6 pages.

International Search Report and Written Opinion received for corresponding Patent Cooperation Treaty Application No. PCT/EP2024/052738, dated May 13, 2024, 14 pages.

"User profile retrieval for migration", 3GPP TSG-SA WG6 Meeting #18, S6-171045, Motorola Solutions, Jul. 17-21, 2017, 6 pages.

* cited by examiner 400 receiving, from a primary mission critical system, one or more user profile configuration documents comprising information identifying one or more partner mission critical systems to which the user equipment can migrate, and a respective one or more user equipment initial configurations associated with each of the one or more partner mission critical systems.

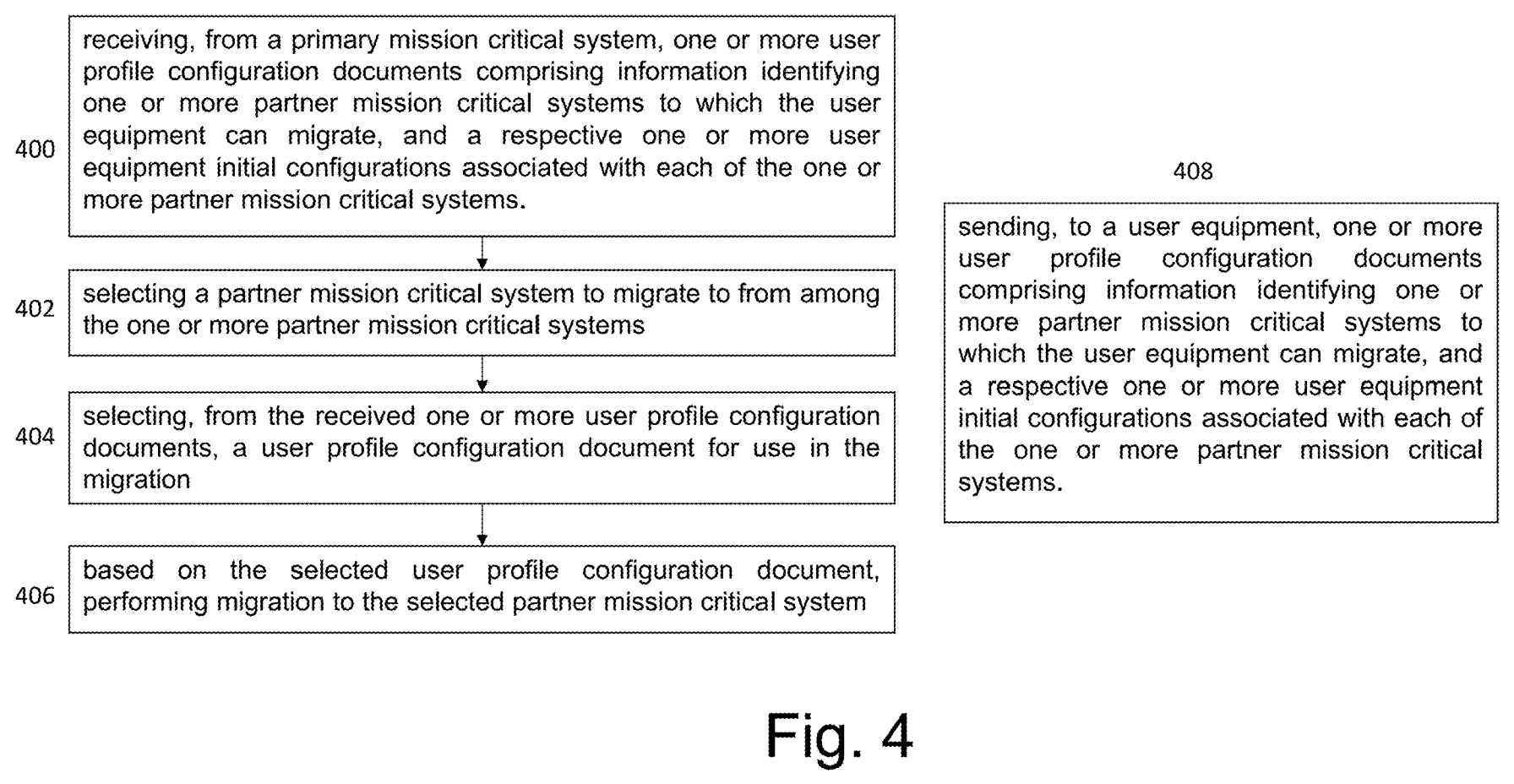

402 selecting a partner mission critical system to migrate to from among the one or more partner mission critical systems 404 selecting, from the received one or more user profile configuration documents, a user profile configuration document for use in the migration 406 based on the selected user profile configuration document, performing migration to the selected partner mission critical system 408 sending, to a user equipment, one or more user profile configuration documents comprising information identifying one or more partner mission critical systems to which the user equipment can migrate, and a respective one or more user equipment initial configurations associated with each of the one or more partner mission critical systems.

Fig. 4

METHOD, APPARATUS AND COMPUTER PROGRAM

FIELD

The present application relates to a method, apparatus, system and computer program and in particular but not exclusively to user equipment migration to a mission critical system.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). Some wireless systems can be divided into cells and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

According to an aspect, there is provided a user equipment comprising means for: receiving, from a primary mission critical system, one or more user profile configuration documents comprising information identifying one or more partner mission critical systems to which the user equipment can migrate, and a respective one or more user equipment initial configurations associated with each of the one or more partner mission critical systems; selecting a partner mission critical system to migrate to from among the one or more partner mission critical systems; selecting, from the received one or more user profile configuration documents, a user profile configuration document for use in the migration; and based on the selected user profile configuration document, performing migration to the selected partner mission critical system.

Selecting the partner mission critical system may be based on the following criteria: the information identifying one or more partner mission critical systems to which the user equipment can migrate includes the identity of the partner mission critical system; the user profile configuration document contains a public land mobile network code corresponding to the registered public land mobile network of the user equipment; and when the public land mobile network code is associated with single network slice selection assistance information, the associated single network slice selection assistance information is included in a list of allowed network slice selection assistance information.

A plurality of candidate partner mission critical systems may meet the criteria, and wherein the means may be for selecting the partner mission critical system from among the plurality of candidate mission critical systems.

Selecting the partner mission critical system may comprise: indicating to a user, one or more partner mission critical systems that satisfy the criteria; and receiving, via a user interface, user input selecting one of the indicated one or more partner mission critical systems.

The plurality of candidate partner mission critical systems may be associated with a plurality of precedence values, and wherein selecting the partner mission critical system may be based on the plurality of precedence values.

Selecting the partner mission critical system may comprises: indicating, to the user, the precedence values associated with the indicated one or more partner mission critical systems.

Selecting the user profile configuration document may comprise selecting a user profile configuration document that satisfies the following conditions: the user profile configuration document contains a public land mobile network code corresponding to the registered public land mobile network of the user equipment; and when the public land mobile network code is associated with single network slice selection assistance information, the associated single network slice selection assistance information is included in a list of allowed network slice selection assistance information.

A plurality of user profile configuration documents may meet the conditions, and wherein the means may be for selecting the user profile configuration document from among the plurality of user profile configuration documents.

The plurality of user profile configuration documents may be associated with a plurality of precedence values, and wherein selecting the user profile configuration document may be based on the plurality of precedence values.

The means may be further for: obtaining, from the primary mission critical system, security information for accessing the selected partner mission critical system.

Performing migration may comprise: performing an authentication procedure with the selected partner mission critical system based on the security information and the user equipment initial configuration comprised in the selected user profile configuration document.

Performing migration may comprise, in response to successfully completing the authentication procedure, performing signalling plane migration to the selected partner mission critical system.

Performing migration may comprise: in response to performing the signalling plane migration, performing an authorization procedure on the partner mission critical system, wherein the migration is successful when the authorization procedure is successfully completed.

The means may be further for: receiving, from the partner mission critical system, information indicating one or more updates to a user profile configuration document, a user equipment initial configuration document, and/or a service configuration document; and updating locally stored information based on the received information.

The means may be further for: sending, to the partner mission critical system, a subscription request associated with the user profile configuration document, the user equipment initial configuration document, and/or the service configuration document, wherein the receiving the information indicating the one or more updates is based on the subscription request.

Selecting the partner mission critical system may be performed before selecting the user profile configuration document; or selecting the partner mission critical system may be performed after selecting the user profile configuration document.

According to an aspect, there is provided a mission critical system comprising means for: sending, to a user equipment, one or more user profile configuration documents comprising information identifying one or more partner mission critical systems to which the user equipment can migrate, and a respective one or more user equipment initial configurations associated with each of the one or more partner mission critical systems.

The means may be further for: providing, to the user equipment, security information for accessing at least one or the one or more partner mission critical systems.

According to an aspect, there is provided a user equipment comprising at least one processor and at least one memory storing instructions that, when executed by the at least one processor, cause the user equipment at least to: receive, from a primary mission critical system, one or more user profile configuration documents comprising information identifying one or more partner mission critical systems to which the user equipment can migrate, and a respective one or more user equipment initial configurations associated with each of the one or more partner mission critical systems; select a partner mission critical system to migrate to from among the one or more partner mission critical systems; select, from the received one or more user profile configuration documents, a user profile configuration document for use in the migration; and based on the selected user profile configuration document, perform migration to the selected partner mission critical system.

The at least one processor may be configured to cause the user equipment to select the partner mission critical system based on the following criteria: the information identifying one or more partner mission critical systems to which the user equipment can migrate includes the identity of the partner mission critical system; the user profile configuration document contains a public land mobile network code corresponding to the registered public land mobile network of the user equipment; and when the public land mobile network code is associated with single network slice selection assistance information, the associated single network slice selection assistance information is included in a list of allowed network slice selection assistance information.

A plurality of candidate partner mission critical systems may meet the criteria, and wherein the at least one processor may be configured to cause the user equipment to select the partner mission critical system from among the plurality of candidate mission critical systems.

The at least one processor may be configured to cause the user equipment to indicate to a user, one or more partner mission critical systems that satisfy the criteria; and receive, via a user interface, user input selecting one of the indicated one or more partner mission critical systems.

The plurality of candidate partner mission critical systems may be associated with a plurality of precedence values, and wherein the at least one processor may be configured to cause the user equipment to select the partner mission critical system may be based on the plurality of precedence values.

The at least one processor may be configured to cause the user equipment to: indicate, to the user, the precedence values associated with the indicated one or more partner mission critical systems.

The at least one processor may be configured to cause the user equipment to select a user profile configuration document that satisfies the following conditions: the user profile configuration document contains a public land mobile network code corresponding to the registered public land mobile network of the user equipment; and when the public land mobile network code is associated with single network slice selection assistance information, the associated single network slice selection assistance information is included in a list of allowed network slice selection assistance information.

A plurality of user profile configuration documents may meet the conditions, and wherein the at least one processor may be configured to cause the user equipment to select the user profile configuration document from among the plurality of user profile configuration documents.

The plurality of user profile configuration documents may be associated with a plurality of precedence values, and wherein the at least one processor may be configured to cause the user equipment to select the user profile configuration document based on the plurality of precedence values.

The at least one processor may be configured to cause the user equipment to: obtain, from the primary mission critical system, security information for accessing the selected partner mission critical system.

The at least one processor may be configured to cause the user equipment to perform an authentication procedure with the selected partner mission critical system based on the security information and the user equipment initial configuration comprised in the selected user profile configuration document.

The at least one processor may be configured to cause the user equipment to, in response to successfully completing the authentication procedure, perform signalling plane migration to the selected partner mission critical system.

The at least one processor may be configured to cause the user equipment to, in response to performing the signalling plane migration, perform an authorization procedure on the partner mission critical system, wherein the migration is successful when the authorization procedure is successfully completed.

The at least one processor may be configured to cause the user equipment to: receive, from the partner mission critical system, information indicating one or more updates to a user profile configuration document, a user equipment initial configuration document, and/or a service configuration document; and updating locally stored information based on the received information.

The at least one processor may be configured to cause the user equipment to: send, to the partner mission critical system, a subscription request associated with the user profile configuration document, the user equipment initial configuration document, and/or the service configuration document, wherein the at least one processor may be configured to cause the user equipment to receive the information indicating the one or more updates based on the subscription request.

The at least one processor may be configured to cause the user equipment to: select the partner mission critical system before selecting the user profile configuration document; or select the partner mission critical system may be performed after selecting the user profile configuration document.

According to an aspect, there is provided a mission critical system comprising at least one processor and at least one memory storing instructions that, when executed by the at least one processor, cause the mission critical system at least to: send, to a user equipment, one or more user profile configuration documents comprising information identifying one or more partner mission critical systems to which the user equipment can migrate, and a respective one or more user equipment initial configurations associated with each of the one or more partner mission critical systems.

The at least one processor may be configured to cause the mission critical system to: provide, to the user equipment, security information for accessing at least one or the one or more partner mission critical systems According to an aspect, there is provided a method performed at a user equipment, the method comprising: receiving, from a primary mission critical system, one or more user profile configuration documents comprising information identifying one or more partner mission critical systems to which the user equipment can migrate, and a respective one or more user equipment initial configurations associated with each of the one or more partner mission critical systems; selecting a partner mission critical system to migrate to from among the one or more partner mission critical systems; selecting, from the received one or more user profile configuration documents, a user profile configuration document for use in the migration; and based on the selected user profile configuration document, performing migration to the selected partner mission critical system.

Selecting the partner mission critical system may be based on the following criteria: the information identifying one or more partner mission critical systems to which the user equipment can migrate includes the identity of the partner mission critical system; the user profile configuration document contains a public land mobile network code corresponding to the registered public land mobile network of the user equipment; and when the public land mobile network code is associated with single network slice selection assistance information, the associated single network slice selection assistance information is included in a list of allowed network slice selection assistance information.

A plurality of candidate partner mission critical systems may meet the criteria, and wherein the method may comprise selecting the partner mission critical system from among the plurality of candidate mission critical systems.

Selecting the partner mission critical system may comprise: indicating to a user, one or more partner mission critical systems that satisfy the criteria; and receiving, via a user interface, user input selecting one of the indicated one or more partner mission critical systems.

The plurality of candidate partner mission critical systems may be associated with a plurality of precedence values, and wherein selecting the partner mission critical system may be based on the plurality of precedence values.

Selecting the partner mission critical system may comprise: indicating, to the user, the precedence values associated with the indicated one or more partner mission critical systems.

Selecting the user profile configuration document may comprise selecting a user profile configuration document that satisfies the following conditions: the user profile configuration document contains a public land mobile network code corresponding to the registered public land mobile network of the user equipment; and when the public land mobile network code is associated with single network slice selection assistance information, the associated single network slice selection assistance information is included in a list of allowed network slice selection assistance information.

A plurality of user profile configuration documents may meet the conditions, and wherein the method may comprise selecting the user profile configuration document from among the plurality of user profile configuration documents.

The plurality of user profile configuration documents may be associated with a plurality of precedence values, and wherein selecting the user profile configuration document may be based on the plurality of precedence values.

The method may comprise: obtaining, from the primary mission critical system, security information for accessing the selected partner mission critical system.

Performing migration may comprise: performing an authentication procedure with the selected partner mission critical system based on the security information and the user equipment initial configuration comprised in the selected user profile configuration document.

Performing migration may comprise, in response to successfully completing the authentication procedure, performing signalling plane migration to the selected partner mission critical system.

Performing migration may comprise: in response to performing the signalling plane migration, performing an authorization procedure on the partner mission critical system, wherein the migration is successful when the authorization procedure is successfully completed.

The method may comprise: receiving, from the partner mission critical system, information indicating one or more updates to a user profile configuration document, a user equipment initial configuration document, and/or a service configuration document; and updating locally stored information based on the received information.

The method may comprise: sending, to the partner mission critical system, a subscription request associated with the user profile configuration document, the user equipment initial configuration document, and/or the service configuration document, wherein the receiving the information indicating the one or more updates is based on the subscription request.

Selecting the partner mission critical system may be performed before selecting the user profile configuration document; or selecting the partner mission critical system may be performed after selecting the user profile configuration document.

According to an aspect, there is provided a method performed at a mission critical system, the method comprising: sending, to a user equipment, one or more user profile configuration documents comprising information identifying one or more partner mission critical systems to which the user equipment can migrate, and a respective one or more user equipment initial configurations associated with each of the one or more partner mission critical systems.

The method may comprise: providing, to the user equipment, security information for accessing at least one or the one or more partner mission critical systems.

According to an aspect, there is provided a computer readable medium comprising instructions which, when executed by a user equipment, cause the user equipment to perform at least the following: receiving, from a primary mission critical system, one or more user profile configuration documents comprising information identifying one or more partner mission critical systems to which the user equipment can migrate, and a respective one or more user equipment initial configurations associated with each of the one or more partner mission critical systems; selecting a partner mission critical system to migrate to from among the one or more partner mission critical systems; selecting, from the received one or more user profile configuration documents, a user profile configuration document for use in the migration; and based on the selected user profile configuration document, performing migration to the selected partner mission critical system.

Selecting the partner mission critical system may be based on the following criteria: the information identifying one or more partner mission critical systems to which the user equipment can migrate includes the identity of the partner mission critical system; the user profile configuration document contains a public land mobile network code corresponding to the registered public land mobile network of the user equipment; and when the public land mobile network code is associated with single network slice selection assistance information, the associated single network slice selection assistance information is included in a list of allowed network slice selection assistance information.

A plurality of candidate partner mission critical systems may meet the criteria, and wherein the instructions may, when executed, cause the user equipment to perform selecting the partner mission critical system from among the plurality of candidate mission critical systems.

Selecting the partner mission critical system may comprise: indicating to a user, one or more partner mission critical systems that satisfy the criteria; and receiving, via a user interface, user input selecting one of the indicated one or more partner mission critical systems.

The plurality of candidate partner mission critical systems may be associated with a plurality of precedence values, and wherein selecting the partner mission critical system may be based on the plurality of precedence values.

Selecting the partner mission critical system may comprises: indicating, to the user, the precedence values associated with the indicated one or more partner mission critical systems.

Selecting the user profile configuration document may comprise selecting a user profile configuration document that satisfies the following conditions: the user profile configuration document contains a public land mobile network code corresponding to the registered public land mobile network of the user equipment; and when the public land mobile network code is associated with single network slice selection assistance information, the associated single network slice selection assistance information is included in a list of allowed network slice selection assistance information.

A plurality of user profile configuration documents may meet the conditions, and wherein the instructions may, when executed, cause the user equipment to perform selecting the user profile configuration document from among the plurality of user profile configuration documents.

The plurality of user profile configuration documents may be associated with a plurality of precedence values, and wherein selecting the user profile configuration document may be based on the plurality of precedence values.

The instructions may, when executed, cause the user equipment to perform: obtaining, from the primary mission critical system, security information for accessing the selected partner mission critical system.

Performing migration may comprise: performing an authentication procedure with the selected partner mission critical system based on the security information and the user equipment initial configuration comprised in the selected user profile configuration document.

Performing migration may comprise, in response to successfully completing the authentication procedure, performing signalling plane migration to the selected partner mission critical system.

Performing migration may comprise: in response to performing the signalling plane migration, performing an authorization procedure on the partner mission critical system, wherein the migration is successful when the authorization procedure is successfully completed.

The instructions may, when executed, cause the user equipment to perform: receiving, from the partner mission critical system, information indicating one or more updates to a user profile configuration document, a user equipment initial configuration document, and/or a service configuration document; and updating locally stored information based on the received information.

The instructions may, when executed, cause the user equipment to perform: sending, to the partner mission critical system, a subscription request associated with the user profile configuration document, the user equipment initial configuration document, and/or the service configuration document, wherein the receiving the information indicating the one or more updates is based on the subscription request.

Selecting the partner mission critical system may be performed before selecting the user profile configuration document; or selecting the partner mission critical system may be performed after selecting the user profile configuration document.

According to an aspect, there is provided a computer readable medium comprising instructions which, when executed by a mission critical system, cause the mission critical system to perform at least the following: sending, to a user equipment, one or more user profile configuration documents comprising information identifying one or more partner mission critical systems to which the user equipment can migrate, and a respective one or more user equipment initial configurations associated with each of the one or more partner mission critical systems.

The the instructions may, when executed, cause the mission critical system to perform: providing, to the user equipment, security information for accessing at least one or the one or more partner mission critical systems.

According to an aspect, there is provided a non-transitory computer readable medium comprising program instructions that, when executed by an apparatus, cause the apparatus to perform at least the method according to any of the preceding aspects.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 4 shows methods according to some examples; and

DETAILED DESCRIPTION

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
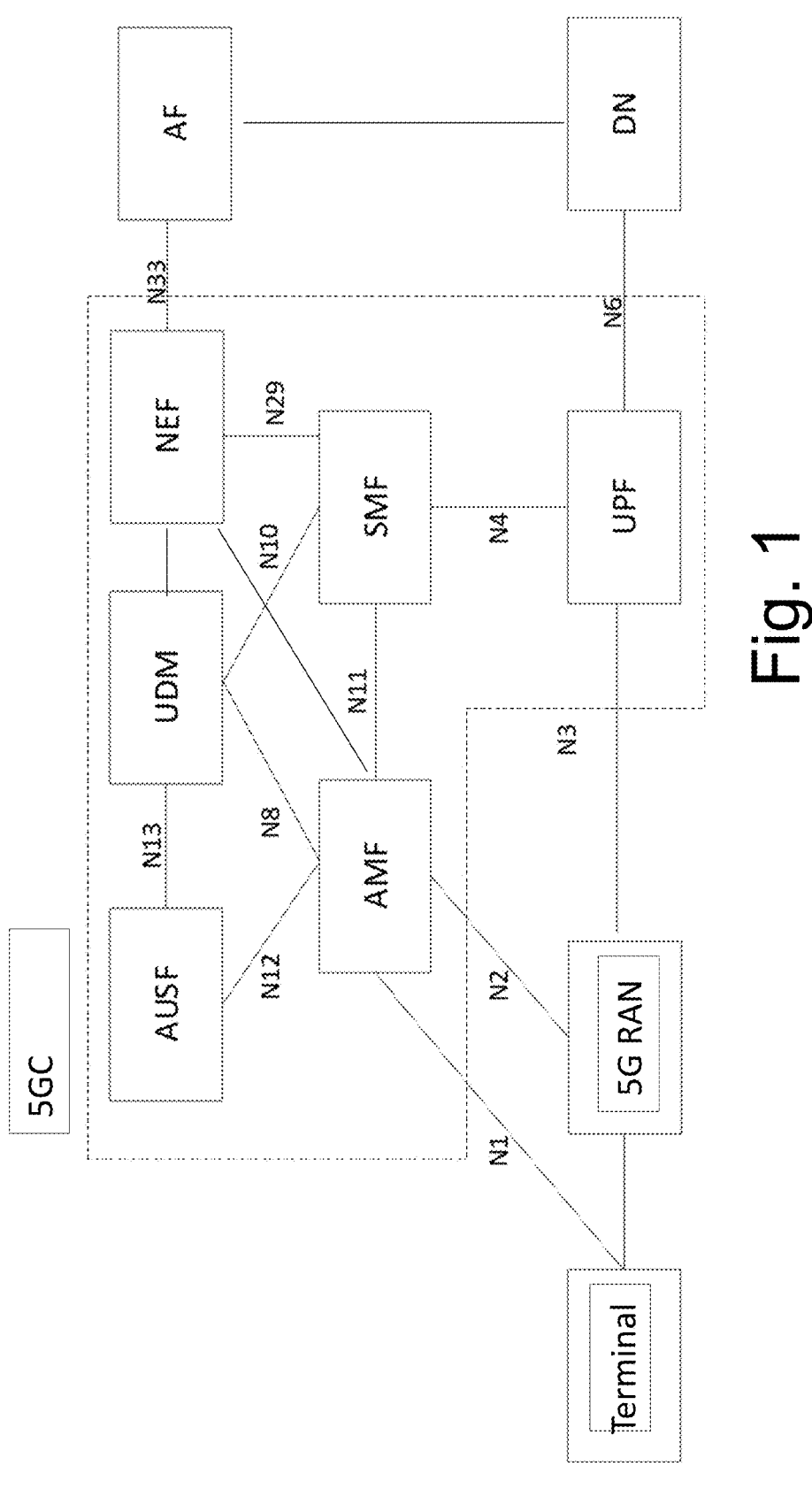
FIG. 1 shows a representation of a network system according to some example embodiments.

FIG. 1 shows a schematic representation of a 5G system (5GS). The 5GS may be comprised by a terminal or user equipment (UE), a 5G radio access network (5GRAN) or next generation radio access network (NG-RAN), a 5G core network (5GC), one or more application function (AF) and one or more data networks (DN).

The 5G-RAN may comprise one or more gNodeB (GNB) or one or more gNodeB (GNB) distributed unit functions connected to one or more gNodeB (GNB) centralized unit functions.

The 5GC may comprise the following entities: Network Slice Selection Function (NSSF); Network Exposure Function; Network Repository Function (NRF); Policy Control Function (PCF); Unified Data Management (UDM); Application Function (AF); Authentication Server Function (AUSF); an Access and Mobility Management Function (AMF); and Session Management Function (SMF). FIG. 1 also shows the various interfaces (N1, N2 etc.) that may be implemented between the various elements of the system.

Figure 2:
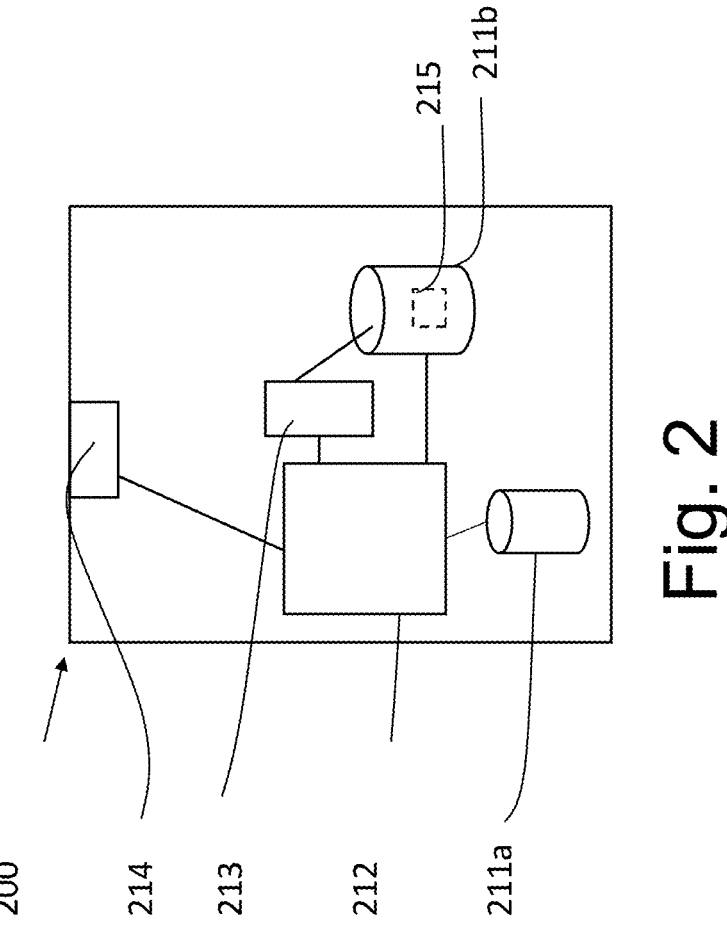
FIG. 2 shows a representation of a control apparatus according to some example embodiments.

FIG. 2 illustrates an example of a control apparatus 200 for controlling a function of the 5GRAN or the 5GC as illustrated on FIG. 1. The control apparatus may comprise at least one random access memory (RAM) 211_a_, at least on read only memory (ROM) 211_b_, at least one processor 212, 213 and an input/output interface 214. The at least one processor 212, 213 may be coupled to the RAM 211_a_ and the ROM 211_b_. The at least one processor 212, 213 may be configured to execute an appropriate software code 215. The software code 215 may for example allow to perform one or more steps to perform one or more of the present aspects. The software code 215 may be stored in the ROM 211_b_. The control apparatus 200 may be interconnected with another control apparatus 200 controlling another function of the 5GRAN or the 5GC. In some embodiments, each function of the 5GRAN or the 5GC comprises a control apparatus 200. In alternative embodiments, two or more functions of the 5GRAN or the 5GC may share a control apparatus.

Figure 3:
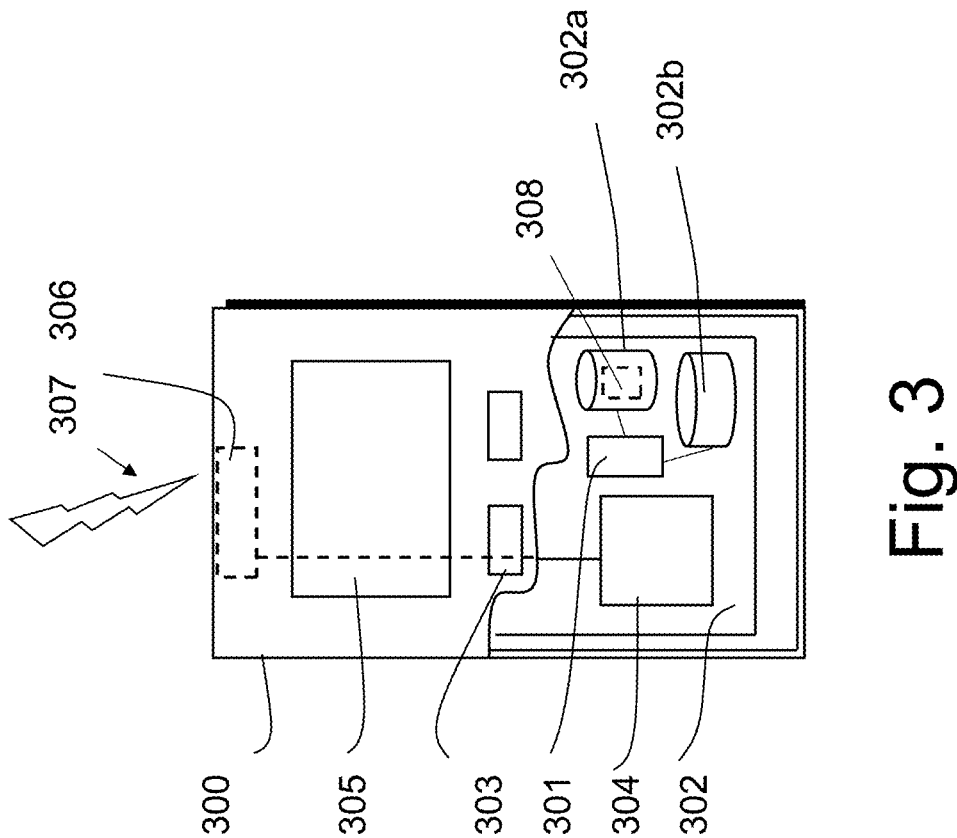
FIG. 3 shows a representation of an apparatus according to some example embodiments.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, an Internet of things (IoT) type communication device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302_a_, at least one RAM 302_b_ and other possible components 303 for use in software and hardware aided execution of tasks it is designed to perform, including control of access to and communications with access systems and other communication devices. The at least one processor 301 is coupled to the RAM 302_b_ and the ROM 302_a_. The at least one processor 301 may be configured to execute an appropriate software code 308. The software code 308 may for example allow to perform one or more of the present aspects. The software code 308 may be stored in the ROM 302_a_.

The processor, storage and other relevant control apparatus can be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

Mission Critical (MC) Services (MCS, or MCX Service) are services, such as MC push-to-talk (MCPTT), MC Data and MC Video, that may make use of capabilities included in Group Communications System Enables and Proximity Services. Various 3GPP documents, such as 3GPP TS 22.179 (for MCPTT), 3GPP TS 22.281 (for MV Video) and 3GPP TS 22.282 (for MC Data) set out some requirements specific to the type of MCS. Other documents, such as 3GPP TS 23.280, set out functional architectures, procedures, and information flows to support MCS.

MCS may be used for public safety applications and/or maritime safety applications, and also for general commercial applications (such as utility companies, railways and maritime usage, etc.). Typically, MCS require low setup and transfer latency, high availability and reliability, strong security, the ability to handle large numbers of users and devices, and priority and pre-emption handling.

A UE may be configured for a specific MC system, for example as per 3GPP TS 23.280, section 10.1.1.1. In brief, a UE may be provided with an initial UE configuration with critical information needed to connect to the MC system. The UE may request access to the MC system and may undergo an authentication & authorization procedure to confirm access. Once authorized and authenticated, the UE may be provided with UE configuration, user profile configuration and group configuration via online configuration. The UE may then perform one or more operations using the MCS (e.g., voice call). The UE may receive updates, for example to the UE configuration, user profile configuration and group configuration, while connected to the MC system. The UE may then log-off from the MC system, ending the MCS session.

While connected to a first MC system, the UE may be migrated to a second MC system. Some examples of the present disclosure may relate to the triggering of the migration and provision of access information to enable the UE to quickly and efficiently communicate with the application plane servers of the partner MC system.

Reference is made to FIG. 4, which shows methods according to some examples. In particular, steps 400-406 show an example method that may be performed by a user equipment, and step 408 shows an example method that may be performed by a mission critical system.

At 400, a method comprises receiving, from a primary mission critical system, one or more user profile configuration documents comprising information identifying one or more partner mission critical systems to which the user equipment can migrate, and a respective one or more user equipment initial configurations associated with each of the one or more partner mission critical systems.

At 402, the method comprises selecting a partner mission critical system to migrate to from among the one or more partner mission critical systems.

At 404, the method comprises selecting, from the received one or more user profile configuration documents, a user profile configuration document for use in the migration.

At 406, the method comprises, based on the selected user profile configuration document, performing migration to the selected partner mission critical system.

At 408, a method comprises sending, to a user equipment, one or more user profile configuration documents comprising information identifying one or more partner mission critical systems to which the user equipment can migrate, and a respective one or more user equipment initial configurations associated with each of the one or more partner mission critical systems.

In some examples, the UE may select a partner MC system. As part of the selection of a partner MC system, the UE may select an MCS user profile configuration. The UE may select the MCS user profile configuration based on user input and/or one or more preconfigured settings.

For example, the UE may select a partner MC system based on PLMN information associated with the UE and the partner MC system(s) and/or NSSAI information associated with the UE and the partner MC system The PLMN information may include a registered PLMN of the UE and/or a PLMN code included in an element for partner MC system(s) of an MCS user profile. The NSSAI information may include an allowed NSSAI of the UE and/or an S-NSSAI included in an element for partner MC system(s) of an MCS user profile.

Figure 5:
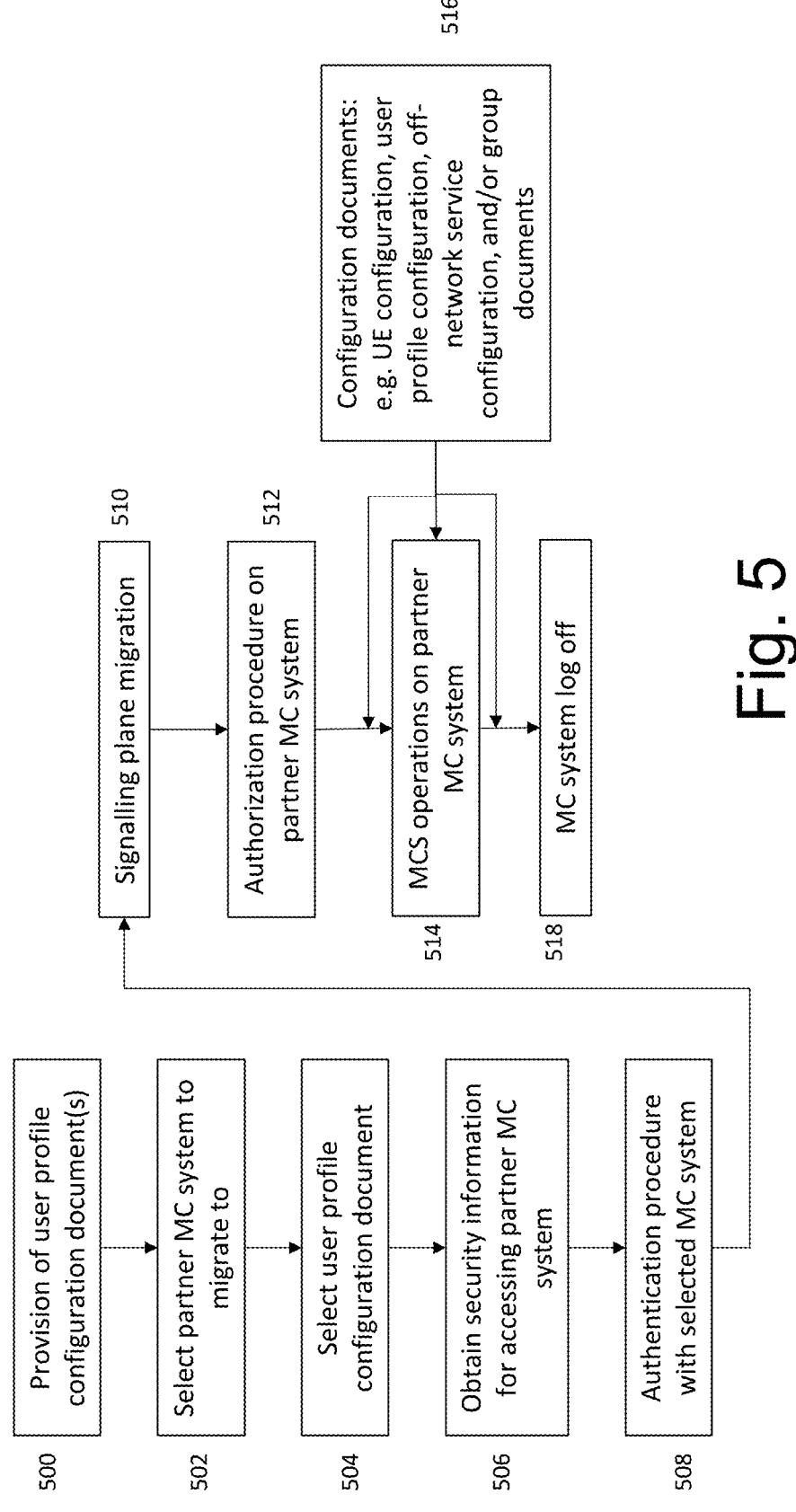
FIG. 5 shows a method according to some examples.

Reference is made to FIG. 5, which shows a method according to some examples.

At 500, the primary MC system provides the UE with one or more user profile configuration documents. Each user profile configuration document may comprise information associated with one or more partner MC systems to which the UE can migrate. The information may comprise an identity of a partner MC system and a UE initial configuration document for the partner MC system. That is to say, in some examples the primary MC system may provide the UE with one or more user profile configuration documents, wherein each user profile configuration document comprises a UE initial configuration document for a partner MC system.

For example, the <OnNetwork> element of a <mcptt-user-profile> document may contain a <MigratablePartnerMCPTTSystemList> element and the <MigratablePartnerMCPTT SystemList> element may include a list of {a <PartnerMCPTTSystemId> element that contains one <uri-entry> element, an <AccessInformationForPartnerMCPTTSystem> element that contains one <mcptt-UE-initial-configuration> element}. It should be understood that similar elements may be applied for other MC application documents, such as MCData and MCVideo documents.

At 502, the UE selects a partner MC system to migrate to. In some examples, the UE may determine a need for MC system migration (e.g., due to the change in the registered PLMN, allowed NSSAI, location) and perform the selection in response to the determination.

In some examples, the UE may select a partner MC system automatically or manually. In some examples, by default the UE may select a partner MC system automatically.

The UE may provide the user with a means to switch between automatic partner MC system selection and manual partner MC system selection. In some examples, when there has been no input from the user after a certain amount of time, or the user has switched from manual partner MC system selection to automatic partner MC system selection, the UE may select a partner MC system automatically. In some examples, when the user has switched from automatic partner MC system selection to manual partner MC system selection, the UE may select a partner MC system manually.

With respect to automatic selection, the UE may select a partner MC system satisfying the following conditions:

1) the identity of the partner MC system is included in the information on partner MC systems to which the UE can migrate in a user profile configuration document configured by the primary MC system;

2) the entry in condition 1) contains a PLMN code corresponding to the registered PLMN of the UE; and 3) when the PLMN code in condition 2) is associated with an S-NSSAI, the associated S-NSSAI is included in a list of allowed NSSAI.

If there is more than one partner MC system satisfying the conditions above, the UE may select a partner MC system from among the partner MC systems satisfying the conditions above. The selection from among the partner MC systems may be implementation specific. In some examples, each entry may be associated with a precedence value, and the UE may select a partner MC system based on the precedence value (e.g., selecting a partner MC system from among the partner MC systems with the highest precedence value).

With respect to manual selection, the UE may indicate, to the user, the identities of partner MC systems satisfying conditions 1)-3) provided above with respect to automatic selection. For example, the UE may display a list of the identities of the partner MC systems satisfying the conditions.

In some examples, the UE may display all partner MC systems' identities as long as the partner MC systems' information is available in user profile configuration documents. In this case, the UE may additionally indicate assistance information so that the user can choose a valid partner MC system (e.g., information indicating that this partner MC system is not available in the current PLMN).

In some examples, when there is more than one partner MC system satisfying the conditions above, the order of the indicated identities may be implementation dependent. In some examples, when each entry is associated with a precedence value, the UE may indicate the identities of the partner MC systems according to the precedence values (e.g., displaying the identity of the partner MC systems in descending precedence value order).

In some examples, when an entry is associated with a human-readable data, the UE may display the human-readable data to the user. In some examples, the UE may have additional configuration data which maps a partner MC system identity to a more user-friendly name and may display the user-friendly names to the user. In some examples, when there are multiple entries corresponding to the same partner MC system, the UE may display the information about the partner MC system once.

The user, having been provided with an indication of the identities of partner MC systems satisfying the conditions, may provide user input (e.g., via a user interface, such as a touchscreen display or the like) to select one of the partner MC systems.

In some examples, the UE may be connected to the primary MC system when performing step 502. In other examples, the UE may initially be connected to the primary MC system to receive the one or more user profile configuration documents from the primary MC system, but may disconnect from the primary MC system before performing step 502.

At 504, the UE selects a user profile configuration document from the documents provided by the primary MC system at 500.

The selection may be based on the following conditions:
1) the entry for the selected MC partner system in the list (i.e., information on partner MC systems to which the UE can migrate) of the user profile configuration document configured by the primary MC system comprises the PLMN code of the registered PLMN of the UE; and
2) when the PLMN code in condition 1) is associated with an S-NSSAI, the associated S-NSSAI is included in the allowed NSSAI.

If there is more than one user profile configuration document satisfying the conditions above, the UE may select a user profile configuration document from among the user profile configuration documents satisfying the conditions above. The selection may be in an implementation-specific way. In some examples, each user profile configuration document may be associated with a precedence value and the UE may choose a user profile configuration document based on the precedence values (e.g. the UE may select a user profile configuration document with a highest precedence value).

To illustrate the selection further, as an example, user profile configuration document 1 may include information on partner MC systems X and Y, and user profile configuration document 2 may include information on partner MC systems Y and Z. Taking into account S-NSSAI/PLMN information associated with partner MC systems X, Y and Z included in the user profile configuration documents 1 and 2, the UE selects partner MC system Y. There may be no guarantee that information on partner MC system Y is identical in user profile configuration documents 1 and 2, and so the UE selects either user profile configuration document 1 or 2, based on the information included in the documents. Note that, in this example, if the UE had selected partner MC system X, then the UE would select user profile configuration document 1 (as information on partner MC system X is not included in user profile configuration document 2).

Alternatively, in some examples the UE may first select a user profile configuration document based on the allowed S-NSSAI, the registered PLMN, and information on partner MC systems to which the UE can migrate and then select a partner MC system based on the allowed S-NSSAI, the registered PLMN, and information on partner MC systems to which the UE can migrate in the selected user profile configuration document. That is to say, in some examples steps 502 and 504 may be performed in a different order to that shown in FIG. 5. In some examples, steps 502 and 504 may be performed at substantially the same time.

At 506, the UE obtains security information for accessing the selected partner MC system. For example, the UE may obtain a security token or the like, which identifies the UE to the partner MC system. The UE may obtain the security information from the primary MC system.

At 508, the UE performs an authentication procedure with the selected partner MC system based on a UE initial configuration document comprised in the selected user profile configuration document (selected at 504) and the obtained security information (obtained at 506).

For example, the UE may contact an identity management server in the selected partner MC system using an address (e.g., HTTPS URI) stored in the UE initial profile configuration document in the entry for the selected partner MC system; and also using the security token obtained from the identity management server in the primary MC system.

At 510, the UE performs signalling plane migration to the selected partner MC system. The signalling plane migration may be performed in response to successfully completing the authentication procedure at 508.

At 512, the UE performs an authorization procedure on the selected partner MC system. The authentication procedure may be according to 3GPP TS. 24.482.

Once authorized, at 514 the UE performs one or more MCS operations on the partner MC system. For example, the UE may perform operations relating to MCPTT, MC Voice, MC Data, and the like.

At 516, configuration documents can be downloaded to the UE in the partner MC system.

In some examples, to download configuration documents, the UE may subscribe to one or more configuration documents. For example, the UE may subscribe to the UE initial configuration document, the user profile configuration document, and/or a service configuration document for each enabled MCS. The configuration documents may be provided by a configuration management server or the like. In some examples, the user profile configuration document to which the UE subscribes may be different from the user profile configuration document selected by the UE which was used to access the selected partner MC system.

The UE may use a procedure for subscribing to multiple documents simultaneously using the subscription proxy function (e.g., the CMS acts as a Subscription Proxy) and subscribe to the MCS group document using a procedure, such as that specified in 3GPP TS 24.481. In some examples, the UE may perform the subscription using one or more identities obtained during the user authentication to the selected partner MC system.

If these documents have been updated since the current version stored in the UE, then the UE may receive a notification (e.g., SIP NOTIFY request) with information indicating one or more updates to the documents. The information may for example comprise an XCAP Diff document. In response to receiving the information, the UE may update its local document copies.

Thus, in some examples, a UE may be provided with information to facilitate the migration of the UE from a first MC system to a second MC system. More specifically, in some examples the UE may be provided with one or more user profile configuration documents, each user profile configuration document comprising an identity of a partner MC system and a UE initial configuration document for the partner MC system. In some examples, various selection criteria/conditions are provided for the selection of a partner MC system and selection of a UE initial configuration for use in the migration.

In some examples, there is provided a user equipment comprising means for performing any of the aforementioned processes. For example, the user equipment may comprise means for: receiving, from a primary mission critical system, one or more user profile configuration documents comprising information identifying one or more partner mission critical systems to which the user equipment can migrate, and a respective one or more user equipment initial configurations associated with each of the one or more partner mission critical systems; selecting a partner mission critical system to migrate to from among the one or more partner mission critical systems; selecting, from the received one or more user profile configuration documents, a user profile configuration document for use in the migration; and based on the selected user profile configuration document, performing migration to the selected partner mission critical system.

In some examples, there is provided a user equipment comprising at least one processor and at least one memory storing instructions that, when executed by the at least one processor, cause the user equipment at least to perform any of the aforementioned processes. For example, the user equipment may comprise at least one processor and at least one memory storing instructions that, when executed by the at least one processor, cause the user equipment at least to: receive, from a primary mission critical system, one or more user profile configuration documents comprising information identifying one or more partner mission critical systems to which the user equipment can migrate, and a respective one or more user equipment initial configurations associated with each of the one or more partner mission critical systems; select a partner mission critical system to migrate to from among the one or more partner mission critical systems; select, from the received one or more user profile configuration documents, a user profile configuration document for use in the migration; and based on the selected user profile configuration document, perform migration to the selected partner mission critical system.

In some examples, there is provided a mission critical system comprising means for performing any of the aforementioned processes. For example, the mission critical system may comprise means for: sending, to a user equipment, one or more user profile configuration documents comprising information identifying one or more partner mission critical systems to which the user equipment can migrate, and a respective one or more user equipment initial configurations associated with each of the one or more partner mission critical systems.

In some examples, there is provided a mission critical system comprising at least one processor and at least one memory storing instructions that, when executed by the at least one processor, cause the mission critical system at least to perform any of the aforementioned processes. For example, the mission critical system may comprise at least one processor and at least one memory storing instructions that, when executed by the at least one processor, cause the mission critical system at least to: send, to a user equipment, one or more user profile configuration documents comprising information identifying one or more partner mission critical systems to which the user equipment can migrate, and a respective one or more user equipment initial configurations associated with each of the one or more partner mission critical systems.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst some embodiments have been described in relation to 5G networks, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory (ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The term "non-transitory," as used herein, is a limitation of the medium itself (i.e., tangible, not a signal) as opposed to a limitation on data storage persistency (e.g., RAM vs. ROM).

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. A user equipment comprising at least one processor and at least one memory storing instructions which, when executed by the at least one processor, cause the user equipment at least to perform:

receiving, from a primary mission critical system, one or more user profile configuration documents, each user profile configuration document of the one or more user profile configuration documents comprising information associated with one or more partner mission critical systems to which the user equipment can migrate, and wherein the information comprises: for each respective partner mission critical system of the one or more partner mission critical systems, an identity of the respective partner mission critical system and a user equipment initial configuration associated with the respective partner mission critical system;

selecting a partner mission critical system to migrate to based on the following criteria:

the partner mission critical system is from among the one or more partner mission critical systems of at least one user profile configuration document of the one or more user profile configuration documents;

the partner mission critical system is associated with a public land mobile network code corresponding to a registered public land mobile network of the user equipment; and when the public land mobile network code is associated with single network slice selection assistance information, the single network slice selection assistance information associated with the public land mobile network code is included in a list of allowed network slice selection assistance information;

selecting the user profile configuration document associated with the partner mission critical system that is selected for use in migration to the partner mission critical system that is selected; and based on the user profile configuration document that is selected, performing the migration to the partner mission critical system that is selected.

2. The user equipment of claim 1, wherein selecting the partner mission critical system comprises:

indicating to a user of the user equipment, at least one of one or more partner mission critical systems that satisfy the criteria; and receiving, via a user interface of the user equipment, user input selecting the partner mission critical system from among the at least one of the one or more partner mission critical systems that is indicated.

3. The user equipment of claim 1, wherein the selecting the user profile configuration document comprises selecting a user profile configuration document of the one or more user profile configuration documents that satisfies the following conditions:

the user profile configuration document contains a public land mobile network code corresponding to the registered public land mobile network of the user equipment; and when the public land mobile network code is associated with single network slice selection assistance information, the associated single network slice selection assistance information is included in a list of allowed network slice selection assistance information.

4. The user equipment of claim 3, wherein a plurality of user profile configuration documents meet the conditions, and wherein the selecting the user profile configuration document of the one or more user profile configuration documents that satisfies the following conditions comprises: for selecting the user profile configuration document from among the plurality of user profile configuration documents.

5. The user equipment of claim 4, wherein the plurality of user profile configuration documents are associated with a plurality of precedence values, and wherein selecting the user profile configuration document of the one or more user profile configuration documents that satisfies the following conditions is based on the plurality of precedence values.

6. The user equipment of claim 1, wherein the instructions, when executed by the at least one processor, further cause the user equipment at least to perform obtaining, from the primary mission critical system, security information for accessing the selected partner mission critical system.

7. The user equipment of claim 6, wherein the performing the migration comprises:
   performing an authentication procedure with the partner mission critical system that is selected, based on the security information and the user equipment initial configuration associated with the partner mission critical system that is selected comprised in the user profile configuration document that is selected.

8. The user equipment of claim 7, wherein the performing the migration comprises, in response to successfully completing the authentication procedure, performing signalling plane migration to the partner mission critical system that is selected.

9. The user equipment of claim 8, wherein the performing the migration comprises:
   in response to the performing the signalling plane migration, performing an authorization procedure on the partner mission critical system that is selected,
   wherein the migration is successful when the authorization procedure is successfully completed.

10. The user equipment of claim 8, wherein the instructions, when executed by the at least one processor, further cause the user equipment at least to perform:
   receiving, from the partner mission critical system, information indicating one or more updates to at least one of: a user profile configuration document; a user equipment initial configuration document; or a service configuration document; and
   updating locally stored information based on the information indicating the one or more updates.

11. The user equipment of claim 10, wherein the instructions, when executed by the at least one processor, further cause the user equipment at least to perform:
   sending, to the partner mission critical system, a subscription request associated with at least one of; the user profile configuration document; the user equipment initial configuration document; or the service configuration document,
   wherein the receiving the information indicating the one or more updates is based on the subscription request.

12. The user equipment of claim 1, wherein the selecting the partner mission critical system is performed before the selecting the user profile configuration document, or wherein the selecting the partner mission critical system is performed after the selecting the user profile configuration document.

13. The user equipment of claim 1, wherein the selecting the partner mission critical system comprises:
   in an instance a plurality of candidate partner mission critical systems meets the criteria, selecting the partner mission critical system from the plurality of candidate mission critical systems.

14. A method performed by a user equipment, the method comprising:
   receiving, from a primary mission critical system, one or more user profile configuration documents, each user profile configuration document of the one or more user profile configuration documents comprising information associated with one or more partner mission critical systems to which the user equipment can migrate, and wherein the information comprises, for each respective partner mission critical system, an identity of the respective partner mission critical system and a user equipment initial configuration associated with the respective partner mission critical system;
   selecting a partner mission critical system to migrate to based on the following criteria:
      the partner mission critical system is from among the one or more partner mission critical systems of at least one user profile configuration document of the one or more user profile configuration documents;
      the partner mission critical system is associated with a public land mobile network code corresponding to a registered public land mobile network of the user equipment; and
      when the public land mobile network code is associated with single network slice selection assistance information, the single network slice selection assistance information associated with the public land mobile network code is included in a list of allowed network slice selection assistance information;
   selecting the user profile configuration document associated with the partner mission critical system that is selected for use in migration to the partner mission critical system that is selected; and
   based on the user profile configuration document that is selected, performing the migration to the partner mission critical system that is selected.

15. The method of claim 14, wherein a plurality of candidate partner mission critical systems meet the criteria, wherein the selecting the partner mission critical system comprises selecting the partner mission critical system from the plurality of candidate mission critical systems.

* * * * *